(12) United States Patent
Tazume

(10) Patent No.: US 11,704,619 B2
(45) Date of Patent: Jul. 18, 2023

(54) PACKAGE RECEPTION MANAGEMENT SYSTEM, PACKAGE RECEPTION MANAGEMENT METHOD, AND PACKAGE RECEPTION MANAGEMENT DEVICE

(71) Applicant: RAKUTEN GROUP, INC., Tokyo (JP)

(72) Inventor: Toshiaki Tazume, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 0 days.

(21) Appl. No.: 17/141,163

(22) Filed: Jan. 4, 2021

(65) Prior Publication Data
US 2021/0272048 A1 Sep. 2, 2021

(30) Foreign Application Priority Data

Feb. 28, 2020 (JP) ................. 2020-032739

(51) Int. Cl.
*G06Q 10/083* (2023.01)
(52) U.S. Cl.
CPC ................. *G06Q 10/083* (2013.01)
(58) Field of Classification Search
None
See application file for complete search history.

(56) References Cited

U.S. PATENT DOCUMENTS

| | | | | |
|---|---|---|---|---|
| 9,202,194 | B1* | 12/2015 | Mistry | G06Q 10/0833 |
| 9,256,852 | B1* | 2/2016 | Myllymaki | G06Q 10/083 |
| 10,303,171 | B1* | 5/2019 | Brady | G05D 1/0278 |
| 2008/0177636 | A1 | 7/2008 | Yoshida et al. | |

(Continued)

FOREIGN PATENT DOCUMENTS

| | | |
|---|---|---|
| JP | 2008028983 A | 2/2008 |
| JP | 2018058656 A | 4/2018 |

(Continued)

OTHER PUBLICATIONS

Han-Na You, Jae-Sik Lee, Jung-Jae Kim, Moon-Seog Jun, "A study on the two-channel authentication method which provides two-way authentication in the Internet banking environment," 5th International Conference on Computer Sciences and Convergence IT, Seoul, 2010, pp. 539-510.1109/ICC (Year: 2010).*

*Primary Examiner* — Omar Zeroual
*Assistant Examiner* — Duane N. Moore
(74) *Attorney, Agent, or Firm* — Hea Law PLLC

(57) ABSTRACT

Provided is a package reception management system including a delivery vehicle configured to move in an unmanned operation. The package reception management system is configured to: acquire a reception region in which a package transported by the delivery vehicle is to be passed to a user being a delivery destination; issue authentication information to be input to the delivery vehicle in the reception region by the user being the delivery destination; and to notify the user of the issued authentication information. In the issuing, the package reception management system sets information for restricting later issuing of the issued authentication information for the reception region, and restricts issuing of the same authentication information as at least one piece of authentication information restricted in the issuing for the reception region.

13 Claims, 13 Drawing Sheets

(56) References Cited

U.S. PATENT DOCUMENTS

| | | | |
|---|---|---|---|
| 2014/0180914 A1* | 6/2014 | Abhyanker | G05D 1/102 |
| | | | 705/332 |
| 2017/0132634 A1* | 5/2017 | James | G06Q 20/4016 |
| 2017/0236193 A1* | 8/2017 | Zundel | G06Q 10/083 |
| | | | 705/16 |
| 2017/0289172 A1* | 10/2017 | Turakhia | H04L 63/062 |
| 2019/0202405 A1 | 7/2019 | Sakurada et al. | |
| 2019/0205966 A1 | 7/2019 | Igata et al. | |

FOREIGN PATENT DOCUMENTS

| | | |
|---|---|---|
| JP | 2019121086 A | 7/2019 |
| JP | 2019121123 A | 7/2019 |

\* cited by examiner

FIG.10

| USER ID | DELIVERY DESTINATION ADDRESS | DELIVERY DESTINATION ROOM NUMBER | ASSOCIATED USERS | REUSE FLAG | FAMILY FLAG |
|---|---|---|---|---|---|
| AAA | XYZ | 501 | BBB | ON | ON |
| BBB | XYZ | 501 | AAA | ON | ON |
| CCC | XYZ | 501 |  | ON | OFF |
| DDD | XYZ | 601 |  | OFF | OFF |

FIG.11

| RECEPTION LOCATION | AUTHENTICATION INFORMATION | ISSUED DATE AND TIME | USER ID | REUSE TIME LIMIT | RESTRICTION TIME LIMIT | DELIVERY VEHICLE |
|---|---|---|---|---|---|---|
| R1 | 123456 | 2020/3/1 10:00 | AAA | 2020/3/1 | 2020/3/3 | V1 |
| R1 | 123123 | 2020/2/29 15:00 | BBB | 2020/2/29 | 2020/3/2 | V2 |
| R1 | 654321 | 2020/3/1 15:00 | CCC | 2020/3/1 | 2020/3/3 | V3 |
| R2 | 123123 | 2020/3/1 15:05 | FFF | 2020/3/1 | 2020/3/3 | V2 |

FIG.12

| RECEPTION LOCATION | AUTHENTICATION INFORMATION | ISSUED DATE AND TIME | USER ID | REUSE TIME LIMIT | RESTRICTION TIME LIMIT | DELIVERY VEHICLE |
|---|---|---|---|---|---|---|
| R1 | 123456 | 2020/3/1 10:00 | AAA | 2020/3/1 | 2020/3/3 | V1 |
| R1 | 123123 | 2020/2/29 15:00 | BBB | 2020/2/29 | 2020/3/2 | V2 |
| R1 | 654321 | 2020/3/1 15:00 | CCC | 2020/3/1 | 2020/3/3 | V3 |
| R2 | 123123 | 2020/3/1 15:05 | FFF | 2020/3/1 | 2020/3/3 | V2 |
| R1 | 123123 | 2020/3/4 10:00 | DDD | 2020/3/4 | 2020/3/6 | V1 |

PACKAGE RECEPTION MANAGEMENT SYSTEM, PACKAGE RECEPTION MANAGEMENT METHOD, AND PACKAGE RECEPTION MANAGEMENT DEVICE

CROSS-REFERENCE TO RELATED APPLICATION

The present application claims priority from Japanese application JP 2020-032739 filed on Feb. 28, 2020, the content of which is hereby incorporated by reference into this application.

BACKGROUND OF THE INVENTION

1. Field of the Invention

The present invention relates to a package reception management system, a package reception management method, and a package reception management device.

2. Description of the Related Art

There is a system configured to enable a user to receive a package from an unmanned device. The system issues authentication information for determining whether or not the user receiving the package is an authorized user. When the user having received the authentication information inputs the authentication information to the device for storing the package, the user is authenticated as an authorized user, and receives the package from the device.

In Japanese Patent Application Laid-open No. 2019-121086, it is disclosed that a password formed by combining numbers, symbols, and the like is issued as the authentication information to be notified to the user for the authentication.

SUMMARY OF THE INVENTION

When the user receiving the package is to be authenticated through use of the input authentication information (for example, a passcode or a PIN), it is desired that the authentication information is not a duplicate of authentication information issued to other irrelevant users. This is because, when pieces of authentication information are duplicate, the package may be passed to a user irrelevant to the user who is to receive the package. Meanwhile, information amount of the authentication information is finite, and hence there has been desired a technology of effectively using the information amount while preventing an authentication error caused by the duplication or the like.

In view of the above, the present disclosure is to provide a technology of effectively using a finite information amount of authentication information when the authentication information is issued to a user who is to receive a package.

According to at least one embodiment of the present invention, there is provided a package reception management system including: a delivery vehicle configured to move in an unmanned operation; an acquisition unit configured to acquire a reception region in which a package transported by the delivery vehicle is to be passed to a user being a delivery destination; an issuing unit configured to issue authentication information to be input to the delivery vehicle in the reception region by the user being the delivery destination; and a notification unit configured to notify the user of the issued authentication information, wherein the issuing unit is configured to set information for restricting later issuing of the issued authentication information for the reception region, and wherein the issuing unit is configured to restrict issuing of the same authentication information as at least one piece of authentication information restricted in the issuing for the reception region.

According to at least one embodiment of the present invention, there is provided a package reception management method including: acquiring a reception region in which a package transported by a delivery vehicle is to be passed to a user being a delivery destination, the delivery vehicle being configured to move in an unmanned operation; issuing authentication information to be input to the delivery vehicle in the reception region by the user being the delivery destination; setting information for restricting later issuing of the issued authentication information for the reception region; and notifying the user of the issued authentication information, wherein the issuing authentication information includes restricting issuing of the same authentication information as at least one piece of authentication information restricted in the issuing for the reception region.

According to at least one embodiment of the present invention, there is provided a package reception management device including: an acquisition unit configured to acquire a reception region in which a package transported by a delivery vehicle is to be passed to a user being a delivery destination, the delivery vehicle being configured to move in an unmanned operation; an issuing unit configured to issue authentication information to be input to the delivery vehicle in the reception region by the user being the delivery destination; and a notification unit configured to notify the user of the issued authentication information, wherein the issuing unit is configured to set information for restricting later issuing of the issued authentication information for the reception region, and wherein the issuing unit is configured to restrict issuing of the same authentication information as at least one piece of authentication information restricted in the issuing for the reception region.

Further, in at least one embodiment of the present invention, the issuing unit may be configured to set the issued authentication information to an issuing inhibition state for the reception region, and the issuing unit may be configured to issue authentication information different from at least one piece of authentication information having the issuing inhibition state for the reception region.

Further, in at least one embodiment of the present invention, the issuing unit may be configured to release the issuing inhibition state of authentication information that has been set to the issuing inhibition state and has a passed issuing restriction time limit, which is set in accordance with an issued time of the authentication information.

Further, in at least one embodiment of the present invention, the issuing unit may be configured to issue first authentication information to be input in the reception region by a first user being a delivery destination of a first package and second authentication information to be input in the reception region by a second user being a delivery destination of a second package, and the issuing unit may be configured to set the issued first authentication information and the issued second authentication information to the issuing inhibition state for the reception region.

Further, in at least one embodiment of the present invention, the issuing unit may be configured to issue, when authentication information set to the issuing inhibition state for the reception region exists for the user being the delivery destination, the authentication information set to the issuing inhibition state as the authentication information to be input by the user in the reception region.

Further, in at least one embodiment of the present invention, the issuing unit may be configured to issue, when authentication information set to the issuing inhibition state for the reception region exists for a user associated with the user being the delivery destination of the package, the authentication information set to the issuing inhibition state as the authentication information to be input by a user who receives the package in the reception region.

Further, in at least one embodiment of the present invention, the notification unit may be configured to notify the authentication information to the user being the delivery destination and the user associated with the user being the delivery destination.

Further, in at least one embodiment of the present invention, the issuing unit may be configured to issue, after the delivery vehicle has arrived at the reception region, the authentication information to be input to the delivery vehicle in the reception region by the user being the delivery destination.

According to at least one embodiment of the present invention, it is possible to effectively use a finite information amount of authentication information when the authentication information is issued to the user who is to receive the package.

BRIEF DESCRIPTION OF THE DRAWINGS

FIG. 10 is a table for showing an example of data stored in a user table.

FIG. 11 is a table for showing an example of data stored in an issuing table.

FIG. 12 is a table for showing another example of the data stored in the issuing table.

DETAILED DESCRIPTION OF THE INVENTION

Figure 1:
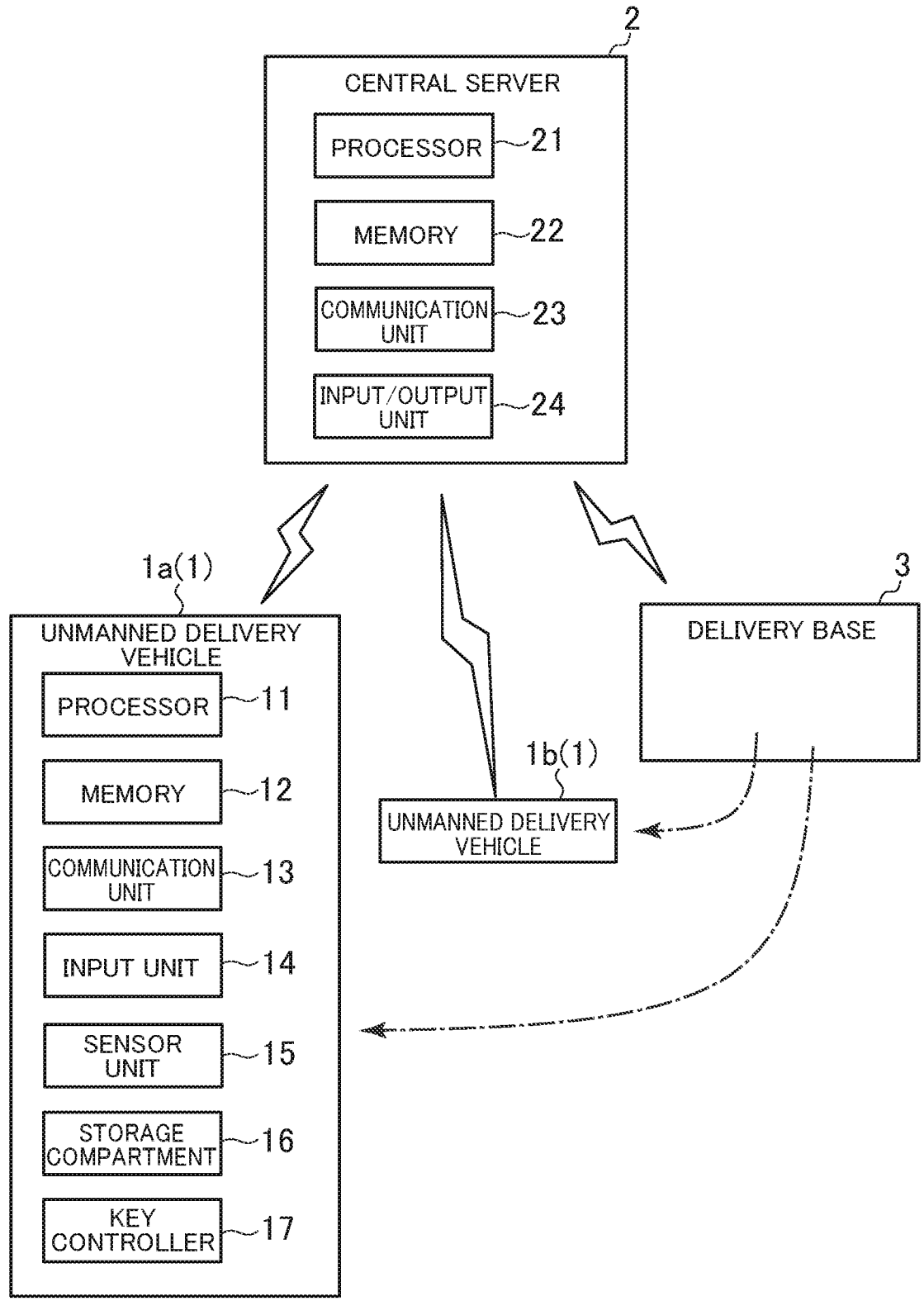
FIG. 1 is a diagram for illustrating an example of a configuration of a delivery system in at least one embodiment of the present invention.

Now, description is given of at least one embodiment of the present invention with reference to the drawings. A redundant description of components denoted by the same reference characters is omitted. In at least one embodiment, description is given of a package delivery system that uses a plurality of unmanned delivery vehicles to deliver packages to, for example, an apartment building in which a plurality of users live.

FIG. 1 is a diagram for illustrating an example of a configuration of a delivery system in at least one embodiment of the present invention. As illustrated in FIG. 1, the package delivery system includes a plurality of unmanned delivery vehicles 1, a central server 2, and a delivery base 3.

The unmanned delivery vehicle 1 is a machine configured to travel on the ground to deliver a package under automatic control without accommodating a driver. The unmanned delivery vehicle 1 is called "unmanned ground vehicle (UGV)." In FIG. 1, two unmanned delivery vehicles 1a and 1b are illustrated, but the number of unmanned delivery vehicles 1 may be three or more. The unmanned delivery vehicle 1 is communicably connected to the central server 2 via wireless communication. The wireless communication may be based on a communication standard, for example, Long Term Evolution (LTE).

The central server 2 is configured to communicate to/from the plurality of unmanned delivery vehicles 1 and the delivery base 3 to manage operations thereof. The delivery base 3 includes a warehouse storing packages to be delivered to users, and in the delivery base 3, for example, an employee of the delivery base 3 stores a package addressed to a user in the unmanned delivery vehicle 1 based on an instruction from the central server 2. The plurality of unmanned delivery vehicles 1 are arranged in the delivery base 3, and the unmanned delivery vehicle 1 delivers a package to a delivery destination from the delivery base 3.

Figure 2:
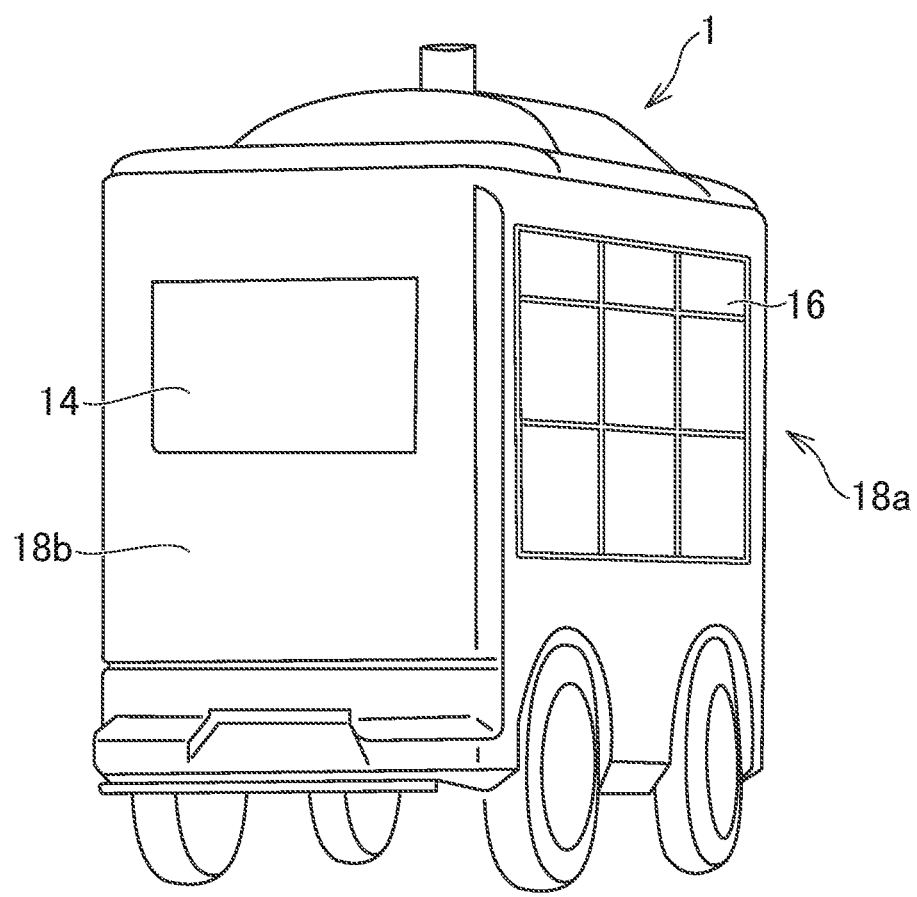
FIG. 2 is a perspective view for illustrating an example of an unmanned delivery vehicle.

FIG. 2 is a perspective view of an example of the unmanned delivery vehicle 1. As illustrated in FIG. 1 and FIG. 2, the unmanned delivery vehicle 1 includes a processor 11, a memory 12, a communication unit 13, an input/output unit 14, a sensor unit 15, a plurality of storage compartments 16, a key controller 17, and a drive unit (not shown).

The processor 11 is configured to execute processing in accordance with a program or data stored in the memory 12. Further, the processor 11 is configured to control the communication unit 13, the input/output unit 14, the sensor unit 15, and the key controller 17.

The memory 12 includes a volatile memory, for example, a RAM, and a non-volatile memory, for example, a flash memory. The memory 12 may further include a storage device, for example, a hard disk drive. The memory 12 stores the above-mentioned program. Further, the memory 12 stores information and calculation results, which are input from the processor 11, the communication unit 13, and the input/output unit 14. The above-mentioned program may be provided through, for example, the Internet, or may be stored in a storage medium capable of being read by a computer, for example, a flash memory, and provided.

The communication unit 13 includes, for example, an integrated circuit implementing a communication interface for wireless communication. The communication unit 13 is configured to input, based on control by the processor 11, information received from other apparatus to the processor 11 or the memory 12, and transmit the information to the other apparatus.

The input/output unit 14 includes a display output device, an input device, and interfaces with those devices. Specifically, the input/output unit 14 is a touch panel with a display (hereinafter referred to as "input panel"), and is used for inputting authentication information (for example, a PIN code or a passcode). The input/output unit 14 may be a display and a physical button, or may be other types of the display output device and input device. The input/output unit 14 is configured to display, based on control by the processor 11, an image on the display output device to acquire data input by the user on the input device.

The sensor unit 15 includes a lidar and a camera configured to recognize the size and position of a peripheral obstacle. The plurality of storage compartments 16 are regions for storing packages. The plurality of storage compartments 16 are provided on respective side surface of the unmanned delivery vehicle 1. Each storage compartment 16 has a takeout opening having a door, and a key is set on the door. The key controller 17 is a circuit configured to electrically control locking or unlocking of the key to the door. In the storage compartment 16, as a part of the sensor unit 15, a sensor configured to detect presence/absence of a package in the storage compartment 16 is arranged. In place of the door, there may be provided a mechanism, for example, a bar, which has a lock configured to prevent unloading of a package from the takeout opening.

The unmanned delivery vehicle 1 includes, on its periphery, side surfaces on which the doors of the storage compartments 16 are arranged, an end portion 18b being a surface which faces in a direction different from that of the side surface and on which the input/output unit 14 is arranged, and an end portion 18a being a surface opposed to the end portion 18b. The lidar is provided on a top surface of the unmanned delivery vehicle 1, and a camera (not shown) is arranged on the end portion 18a.

The central server 2 includes a processor 21, a memory 22, a communication unit 23, and an input/output unit 24. The central server 2 may be one physical server, or may include a plurality of physical servers like a so-called cloud computing system.

The processor 21 is configured to execute processing in accordance with a program and data stored in the memory 22. Further, the processor 21 is configured to control the communication unit 23 and the input/output unit 24.

The memory 22 includes a volatile memory, for example, a RAM, a non-volatile memory, for example, a flash memory, and a storage device, for example, a hard disk drive. The memory 22 stores the above-mentioned program. Further, the memory 22 stores information or calculation results, which are input from the processor 21, the communication unit 23, and the input/output unit 24. The above-mentioned program may be provided through, for example, the Internet, or may be stored in a storage medium capable of being read by a computer, for example, a flash memory, and provided.

The communication unit 23 includes, for example, an integrated circuit implementing a communication interface for wired communication. The communication unit 23 is configured to input, based on control by the processor 21, information received from other apparatus to the processor 21 or the memory 22, and transmit the information to the other apparatus. The communication unit 23 may communicate to/from the unmanned delivery vehicle 1 via a communication network and a wireless communication device included in the communication network.

The input/output unit 24 includes a video controller configured to control display, and a controller configured to acquire data from an input device. The input device includes, for example, a touch panel, a keyboard, or a mouse. The input/output unit 24 is configured to output, based on control by the processor 21, display data to the display output device, and acquire data input by the user through operation of the input device.

Figure 3:
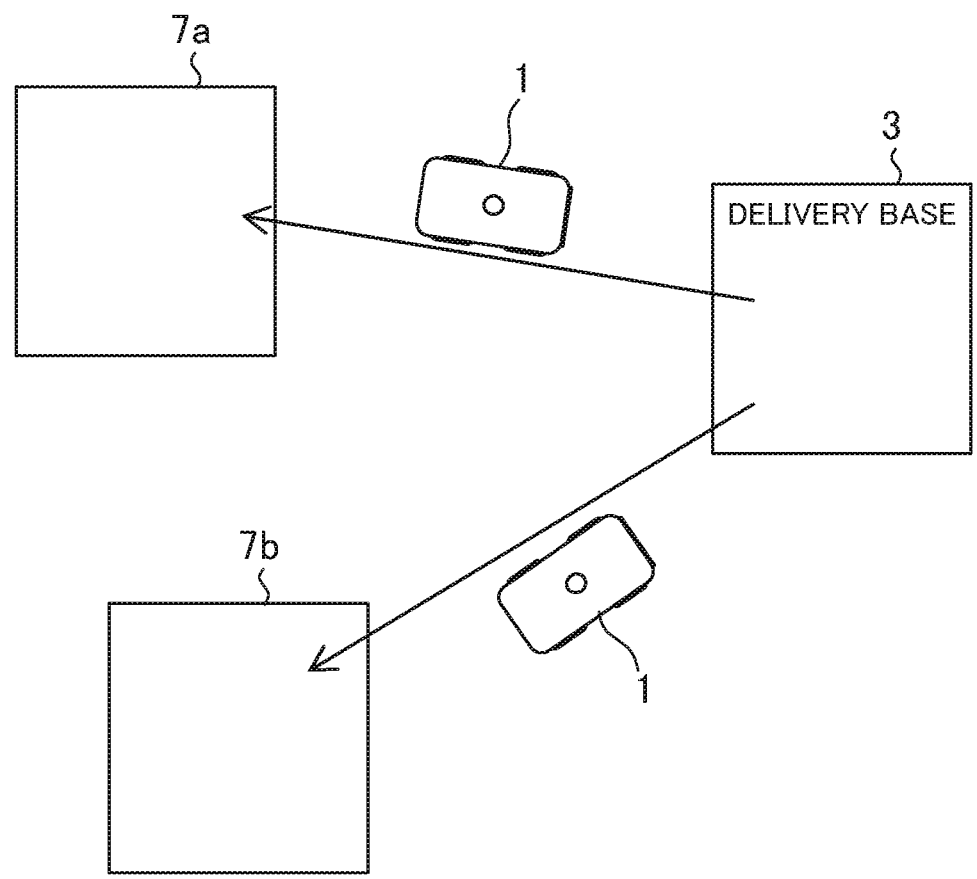
FIG. 3 is a diagram for schematically illustrating a delivery base and reception locations.

Description is now given of the delivery of a package by the package delivery system. FIG. 3 is a diagram for schematically illustrating the delivery base 3 and reception locations 7a and 7b. A delivery destination of a package is, for example, an apartment building. The reception locations 7a and 7b are provided for the respective delivery destinations. The reception locations 7a and 7b are standby regions in which the unmanned delivery vehicle 1 arriving from the delivery base 3 can wait. Each of the reception locations 7a and 7b may be formed of a plurality of standby regions apart from one another.

Figure 4:
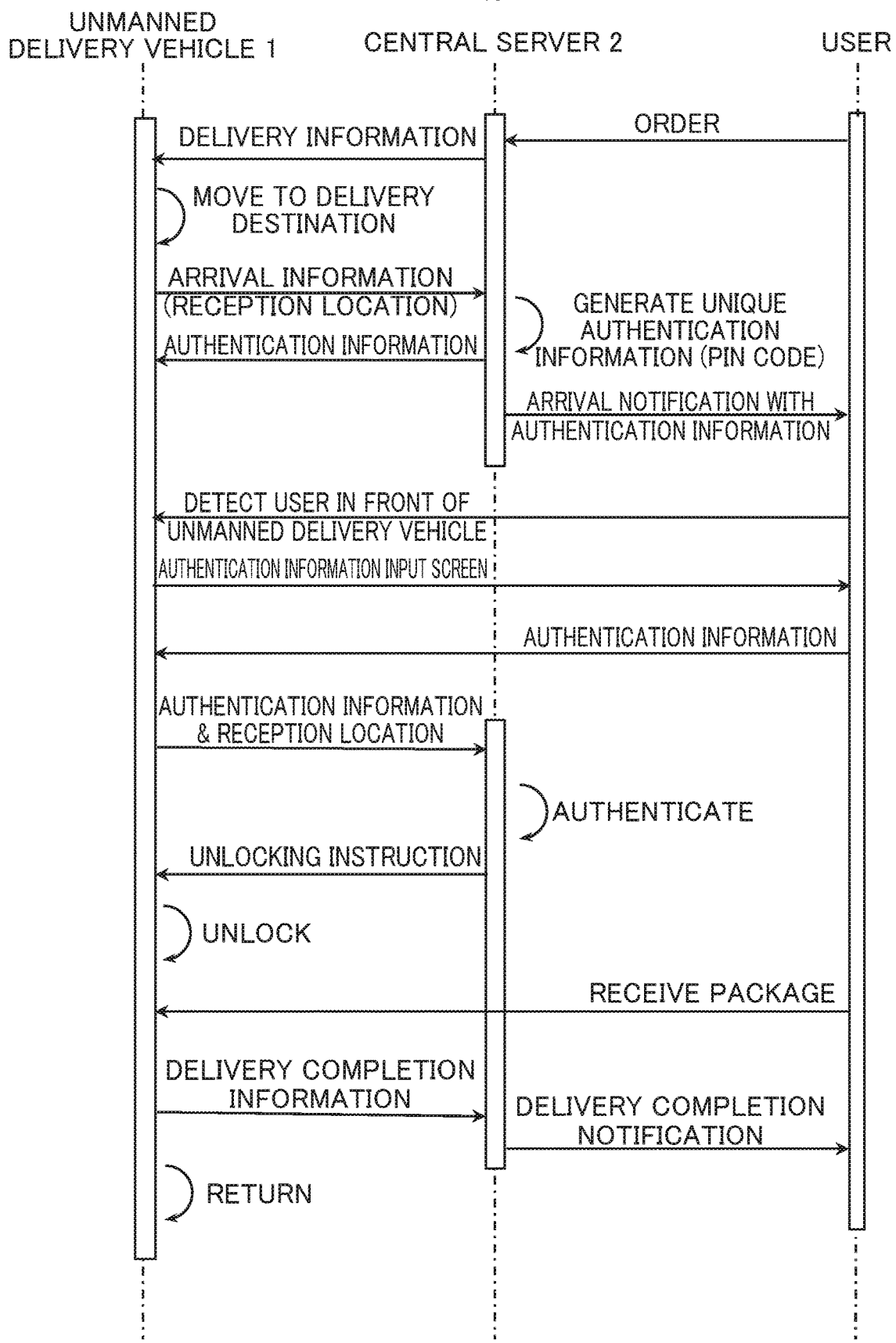
FIG. 4 is a sequence diagram for illustrating an operation of the delivery system.

FIG. 4 is a sequence diagram for illustrating an operation of the delivery system. In FIG. 3, there is illustrated a sequence in which the unmanned delivery vehicle 1 moves to the standby location of the delivery destination, the user receives a package, and the delivery is completed.

First, the user orders a product from the central server 2, and in order to deliver a package including the ordered product to the user, the central server 2 transmits, to the unmanned delivery vehicle 1, an instruction (delivery information) to deliver the package. The central server 2 transmits, to the delivery base 3, an instruction to store the package in the unmanned delivery vehicle 1, and a staff member of the delivery base 3 stores the package in the storage compartment 16 of the unmanned delivery vehicle 1. Next, the unmanned delivery vehicle 1 moves to the delivery destination (e.g., entrance of apartment building), and when the unmanned delivery vehicle 1 has arrived at the reception location specified in advance at the delivery destination, the unmanned delivery vehicle 1 transmits arrival information to the central server 2. The arrival information includes vehicle body information for identifying the unmanned delivery vehicle 1 and information indicating the reception location.

When the central server 2 has received the arrival information, the central server 2 generates unique authentication information, and transmits the generated authentication information to the unmanned delivery vehicle 1. Moreover, the central server 2 transmits an arrival notification including the authentication information to the user (more strictly, device owned by user). The authentication information to be transmitted to the user is, for example, a PIN code or a passcode. The PIN code may be a six-digit number or alphanumeric characters. The passcode may be longer alphanumeric characters. Moreover, as the authentication information, image data of a two-dimensional code, for example, the QR code (trademark), may be transmitted. The unmanned delivery vehicle 1 receives the authentication information, and continues to wait at the reception location.

After that, when the user has approached the unmanned delivery vehicle 1, the unmanned delivery vehicle 1 detects the approach of the user, and displays an authentication information input screen on the display. When the user has input the authentication information to the input/output unit 14 of the unmanned delivery vehicle 1, the unmanned delivery vehicle 1 transmits, to the central server 2, information indicating the reception location and the authentication information.

The central server 2, which has received the authentication information and the reception location, confirms whether or not the authentication information is appropriate, and authenticates the user who has input the authentication information. After that, the central server 2 transmits, to the unmanned delivery vehicle 1 storing the package to be received by the user, an unlocking instruction to unlock the key to the door of the storage compartment 16 storing the package. Then, the unmanned delivery vehicle 1 unlocks the key to the storage compartment 16.

The user receives a package stored in the unlocked storage compartment 16. When the unmanned delivery vehicle 1 has detected the fact that the user has received the package, the unmanned delivery vehicle 1 transmits, to the central server 2, delivery completion information indicating completion of the delivery, and the central server 2 transmits a delivery completion notification to the user. After that, the unmanned delivery vehicle 1 returns to the delivery base 3.

Figure 5:
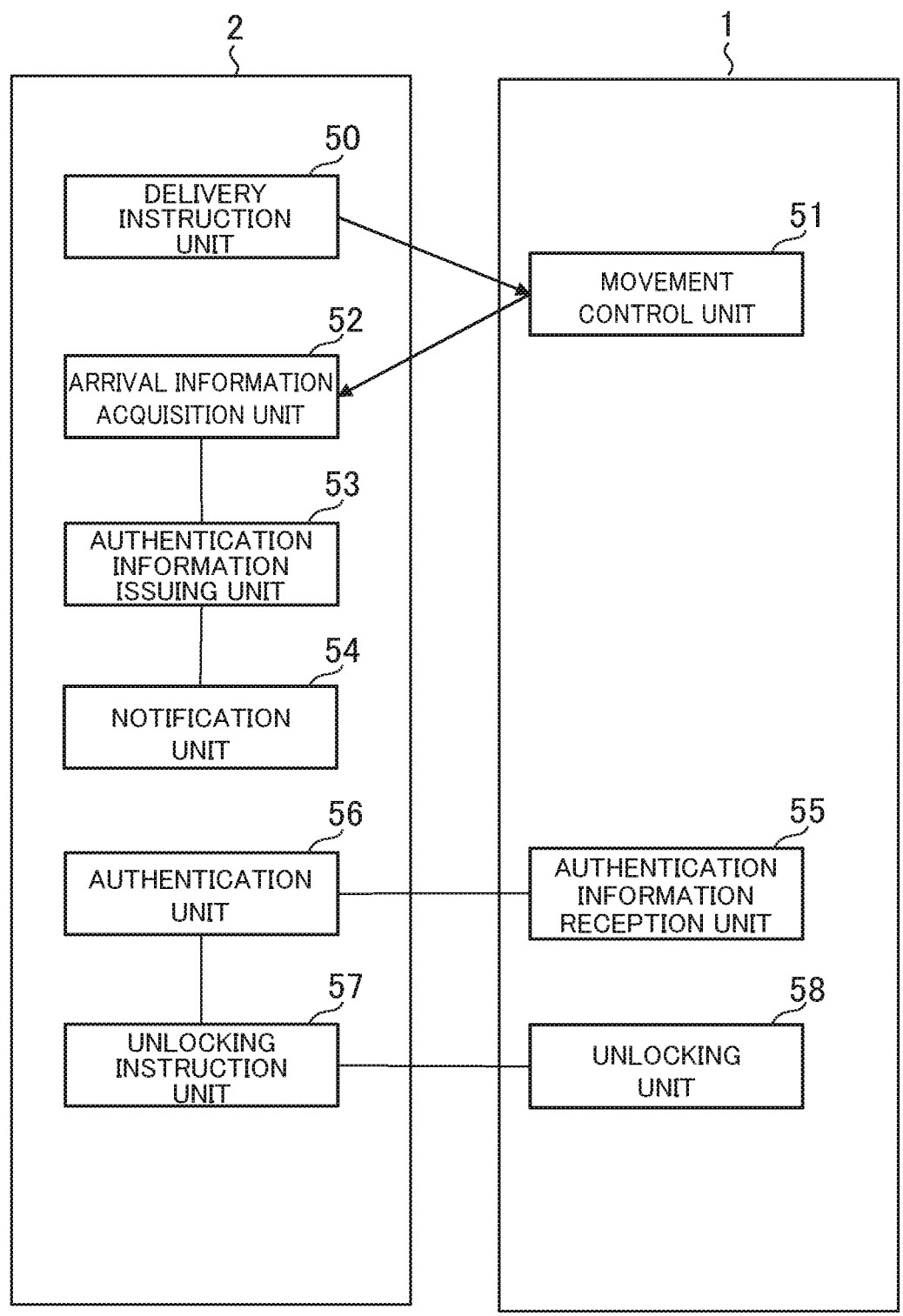
FIG. 5 is a block diagram for illustrating a functional configuration of the delivery system.

Now, description is given of processing of the delivery system more in detail. FIG. 5 is a block diagram for illustrating functions to be implemented by the delivery system. In at least one embodiment, the package delivery system includes, from the functional point of view, a delivery instruction unit 50, a movement control unit 51, an arrival information acquisition unit 52, an authentication information issuing unit 53, a notification unit 54, an authentication information reception unit 55, an authentication unit 56, an unlocking instruction unit 57, and an unlocking unit 58. The delivery instruction unit 50, the arrival information acquisition unit 52, the authentication information issuing unit 53, the notification unit 54, the authentication unit 56, and the unlocking instruction unit 57 are implemented by the processor 21 included in the central server 2 executing programs stored in the memory 22 to control the communication unit 23. Those functions may be implemented by the processors 21 included in the plurality of servers executing programs. The movement control unit 51, the authentication information reception unit 55, and the unlocking unit 58 are implemented by the processor 11 included in the unmanned delivery vehicle 1 executing programs stored in the memory 12 to control the communication unit 13, the input/output unit 14, the sensor unit 15, and the key controller 17.

The delivery instruction unit 50 of the central server 2 is configured to instruct the delivery base 3 and the unmanned delivery vehicle 1 to deliver a package addressed to the user. More specifically, when a package (package addressed to user) including a product ordered by the user is in the delivery base 3, the delivery instruction unit 50 transmits, to the delivery base 3, an instruction to store the package addressed to the user in the storage compartment 16 of the unmanned delivery vehicle 1, and further transmits, to the unmanned delivery vehicle 1, an instruction (delivery information) to deliver the package to the delivery destination of that user.

The movement control unit 51 of the unmanned delivery vehicle 1 is configured to control movement of the unmanned delivery vehicle 1 from the delivery base 3 to the delivery destination and movement of the unmanned delivery vehicle 1 from the delivery destination to the delivery base 3 based on data acquired by the lidar or a GPS sensor of the unmanned delivery vehicle 1. The movement control unit 51 may be configured to control the movement based on the data acquired by the camera. A part of functions of the movement control unit 51 may be implemented by a server computer. When the unmanned delivery vehicle 1 has arrived at the reception location at which the delivery destination waits for the arrival of the user at the delivery destination, the movement control unit 51 transmits, to the central server 2, arrival information including the reception location at which the unmanned delivery vehicle 1 is currently waiting.

The arrival information acquisition unit 52 of the central server 2 acquires, from the unmanned delivery vehicle 1, the arrival information including the reception location at which the package transported by the unmanned delivery vehicle 1 is to be passed to the user being the delivery destination.

The authentication information issuing unit 53 of the central server 2 issues authentication information to be input to the unmanned delivery vehicle 1 at the reception location by the user being the delivery destination. The authentication information is used to authenticate the user who comes to receive the package. The authentication information is information that can be used to authenticate the user even when the authentication information is used alone without information for identifying the user. The authentication information issuing unit 53 sets information for restricting later issuing of the issued authentication information for the reception location, to thereby restrict issuing of the same authentication information as at least one piece of authentication information restricted in issuing for the reception location. For example, the authentication information issuing unit 53 sets the authentication information to be issued to an issuing inhibition state for the reception location, and issues authentication information different from the at least one piece of authentication information in the issuing inhibition state for the reception location. A detailed description is later given of the issuing inhibition state. It should be understood that, when a plurality of packages are to be delivered to different users, the authentication information issuing unit 53 issues pieces of authentication information different from one another, and further sets those pieces of authentication information to the issuing inhibition state.

The notification unit 54 of the central server 2 notifies the user of the issued authentication information (specifically, transmits authentication information to device owned by user). In this case, the notification unit 54 may notify associated users (for example, users among family members living together with the user) associated with the user of the issued authentication information.

The authentication information reception unit 55 of the unmanned delivery vehicle 1 is configured to receive the authentication information input from the user through the input/output unit 14. Further, the authentication information reception unit 55 is configured to transmit the received authentication information to the central server 2.

The authentication unit 56 of the central server 2 is configured to receive the authentication information from the unmanned delivery vehicle 1, and authenticate the user based on the authentication information.

The unlocking instruction unit 57 of the central server 2 is configured to transmit, to the unmanned delivery vehicle 1 storing a package addressed to the authenticated user, an instruction (unlocking instruction) to unlock the key (more strictly, key of door) of the storage compartment 16 storing the package addressed to the user.

The unlocking unit 58 of the unmanned delivery vehicle 1 is configured to receive the unlocking instruction, and unlock the key to the storage compartment 16 storing the package addressed to the user based on the unlocking instruction. Moreover, the unlocking unit 58 detects, based on the output of the sensor unit 15, whether or not the package in the storage compartment 16 has been removed (which means whether or not user has received package). When the unlocking unit 58 has detected the fact that the user has received the package, the unlocking unit 58 transmits, to the central server 2, delivery completion information indicating the completion of the delivery of the package to the user.

Figure 6:
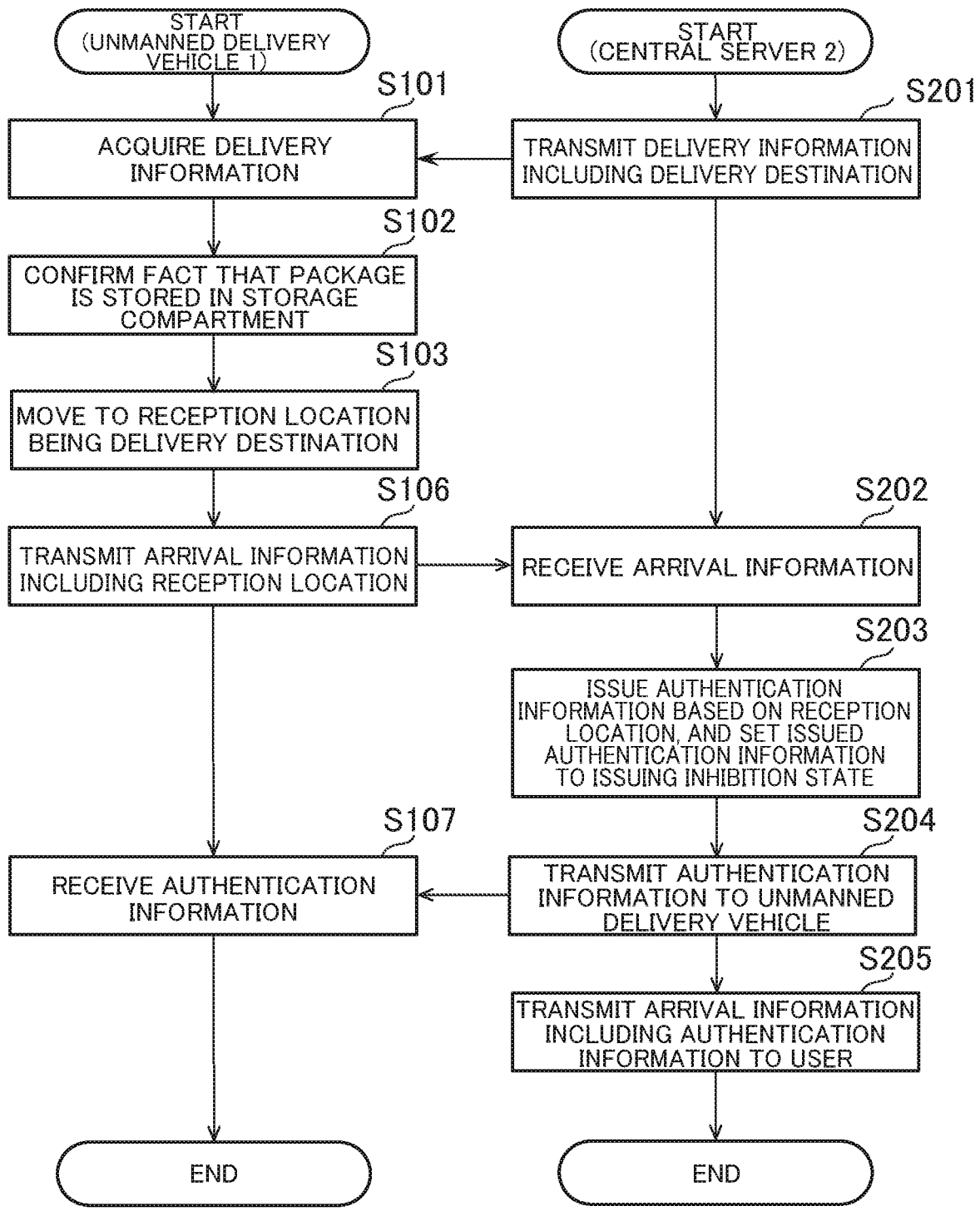
FIG. 6 is a flowchart for illustrating an example of processing to be executed by the unmanned delivery vehicle and a central server.

FIG. 6 is a flowchart for illustrating an example of processing to be executed by the unmanned delivery vehicle 1 going to the delivery destination and the central server 2. The processing illustrated in FIG. 6 corresponds to a part up to the transmission of the arrival notification of the operation illustrated in the sequence diagram of FIG. 4.

First, the delivery instruction unit 50 of the central server 2 transmits delivery information including the delivery destination to the unmanned delivery vehicle 1 (Step S201). The delivery instruction unit 50 stores, in the memory 22, a user, a package, the unmanned delivery vehicle 1 storing the package, and the reception location of the delivery destination of the package in association with one another. The movement control unit 51 of the unmanned delivery vehicle 1 acquires the delivery information (Step S101). Further, the movement control unit 51 of the unmanned delivery vehicle 1 confirms the fact that a package indicated by the delivery instruction is stored in the storage compartment 16 at the delivery base 3 (Step S102), and moves the unmanned delivery vehicle 1 to the reception location of the delivery destination (Step S103). A publicly known technology, such as unmanned driving or automatic delivery, may be used for control of the movement, and a detailed description of the control is omitted.

When the unmanned delivery vehicle 1 has approached or arrived at the reception location of the delivery destination, the movement control unit 51 transmits, to the central server 2, the arrival information including the reception location and the vehicle body information (Step S106). The arrival information acquisition unit 52 of the central server 2 receives the arrival information (Step S202).

The authentication information issuing unit 53 of the central server 2 issues authentication information based on the reception location included in the received arrival information, and sets the authentication information to the issuing inhibition state (Step S203). The authentication information issuing unit 53 issues the authentication information that is not a duplicate of other pieces of authentication information generated to other users for the same reception location. Description is later given of details of processing of issuing the authentication information and setting the issuing inhibition state.

When the authentication information has been issued, the authentication information issuing unit 53 transmits the authentication information to the unmanned delivery vehicle 1 that has transmitted the arrival information (Step S204). The unmanned delivery vehicle 1 receives the authentication information (Step S107), and stores, in the memory 12, the received authentication information and information for identifying the storage compartment 16 storing the package in association with each other.

Moreover, the notification unit 54 transmits the arrival information including the authentication information to the user being the delivery destination (Step S205).

Figure 7:
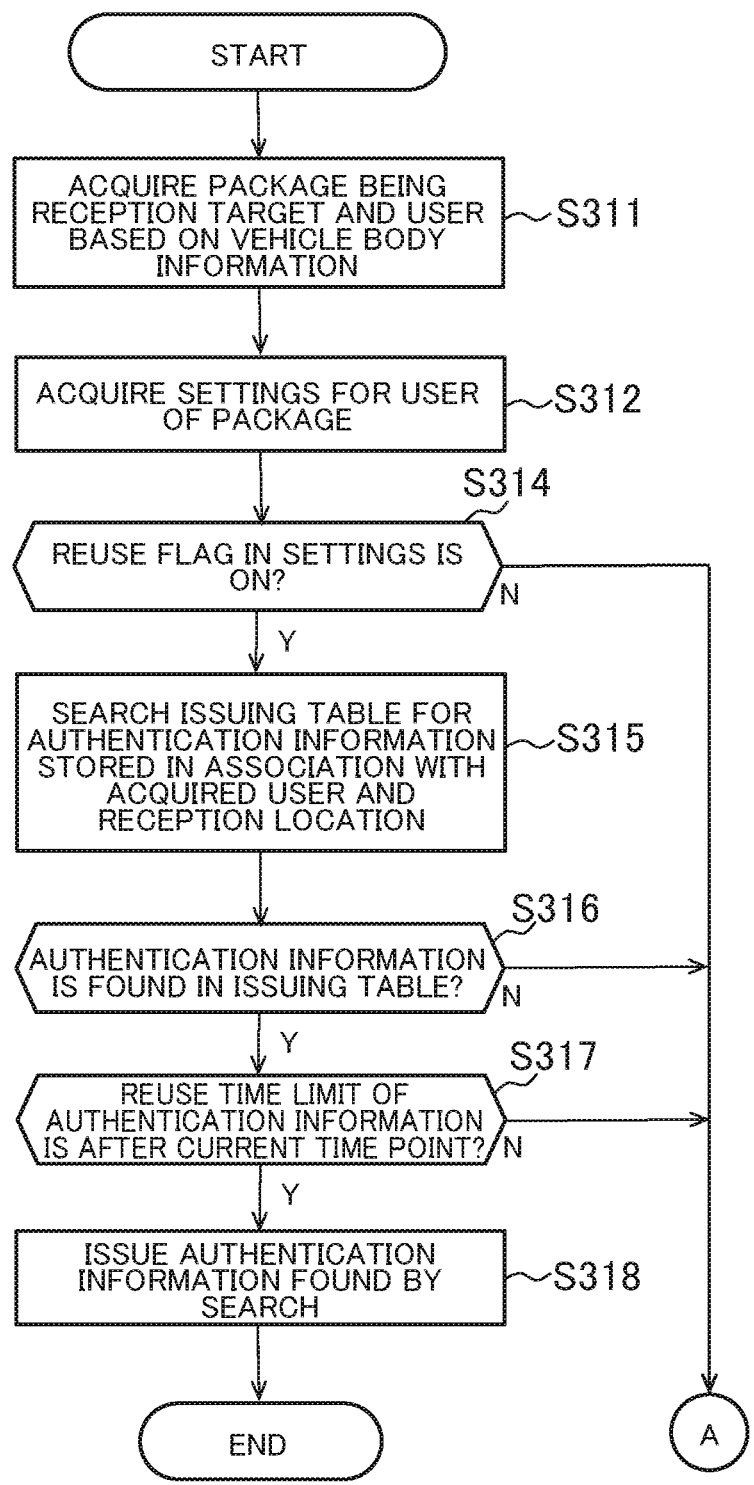
FIG. 7 is a flowchart for illustrating an example of processing to be executed by an authentication information issuing unit.
Figure 8:
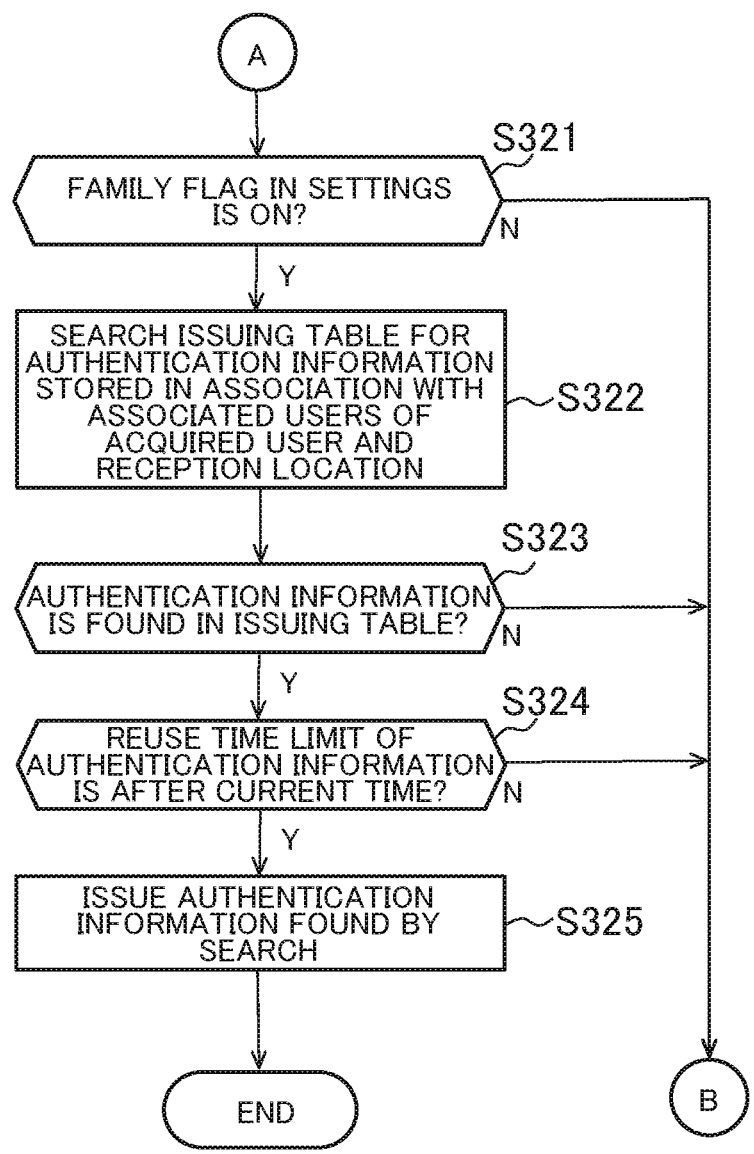
FIG. 8 is a flowchart for illustrating the example of the processing to be executed by the authentication information issuing unit.
Figure 9:
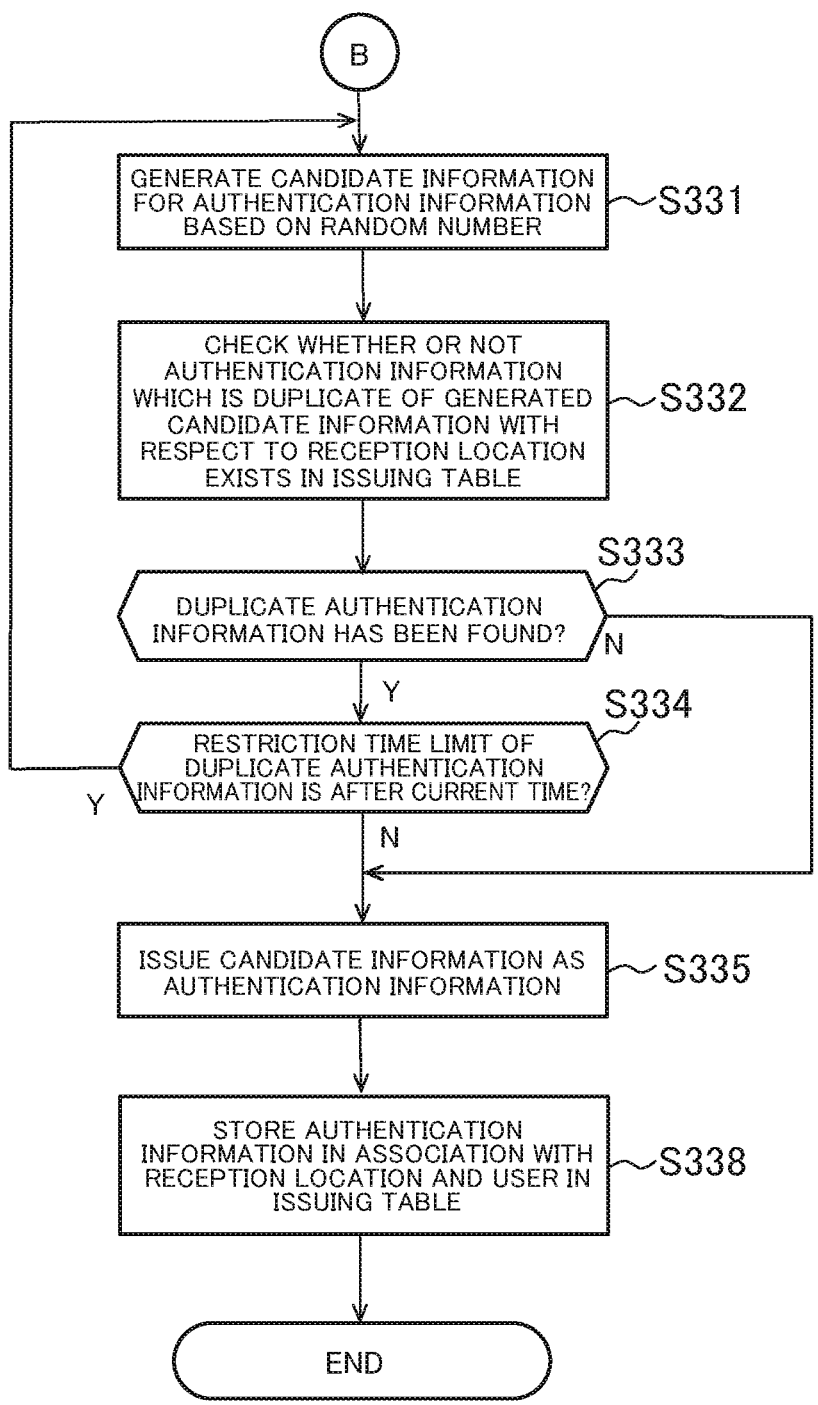
FIG. 9 is a flowchart for illustrating the example of the processing to be executed by the authentication information issuing unit.

Description is now given of details of the processing in Step S203. FIG. 7 to FIG. 9 are flowcharts for illustrating an example of processing to be executed by the authentication information issuing unit 53. First, the authentication information issuing unit 53 acquires the package to be passed at the reception location and the user receiving the package based on the vehicle body information included in the received arrival information and the information stored in the memory 22 in Step S201 (Step S311). Moreover, the authentication information issuing unit 53 acquires, from a user table, settings (in particular, reuse flag and family flag) for the user receiving the package (Step S312).

FIG. 10 is a table for showing an example of data stored in the user table. In the example of FIG. 10, each piece of user information stored in the user table includes a user ID, a delivery destination address and a delivery destination room number of a user, associated users, the reuse flag, and the family flag. The delivery destination address is information indicating a building being the delivery destination. The delivery destination room number is information for identifying a room in the building being the delivery destination. The address and the room number of the delivery destination are separated for the convenience of description, but may be combined into the same field. The associated users are, for example, user IDs of users living at the same place, and are thus user IDs of users who can receive the package in place of the user. The reuse flag is information indicating whether or not authentication information having been issued once is allowed to be reused for the reception location and the user for a certain period of time. In the example of FIG. 10, "ON" indicates that the authentication information can be reused. Moreover, the family flag is information indicating whether or not authentication information having issued to the associated users before is allowed to be reused for a certain period of time. In the example of FIG. 10, "ON" indicates that the authentication information having issued to the associated users can be reused.

When the settings for the user have been acquired, the authentication information issuing unit 53 determines whether the reuse flag of the settings is "ON" or "OFF" (Step S314). When the reuse flag of the settings is "OFF" (N in Step S314), the authentication information issuing unit 53 does not execute processing from Step S315 to Step S318 described below, and executes processing starting from Step S321 of FIG. 8. Meanwhile, when the reuse flag of the settings is "ON" (Y in Step S314), the authentication information issuing unit 53 searches an issuing table for authentication information stored in association with the user receiving the package and the reception location (Step S315).

FIG. 11 is a table for showing an example of data stored in the issuing table. The issuing table is stored in the memory 22. At least one piece of issuing information is stored in the issuing table. Each piece of the issuing information includes a reception location, authentication information, issued date and time of the authentication information, a user ID, a reuse time limit, a restriction time limit, and a delivery vehicle. The user ID is to identify a user to be authenticated by the authentication information so as to receive a package. The reuse time limit indicates an end of a period in which the authentication information can repeatedly be issued to the same user or associated users. The restriction time limit indicates an end of a period in which the issuing of the authentication information is restricted. The authentication information is not issued in a period before the restriction time limit. In particular, the authentication information is issued to no user after the reuse time limit and before the restriction time limit. In FIG. 11, each of the reuse time limit and the restriction time limit is represented as a date set in accordance with the issued date, but may be a date and a time obtained by adding a predetermined period of time to the issued date and time.

In Step S315, the authentication information issuing unit 53 searches the issuing information by using the user receiving the package and the reception location as search conditions through a database management system. In at least one embodiment, the issuing table is stored in the memory 22 by the database management system, but the authentication information issuing unit 53 may directly store the issuing information in the memory 22.

When issuing information (including the authentication information) stored in association with the acquired user and the reception location has been found from the issuing table in the search (Y in Step S316), and the current time is before the reuse time limit of the authentication information included in the issuing information (Y in Step S317), the authentication information issuing unit 53 issues the authentication information found in the search as authentication information to be input by the user to receive the package for this time (Step S318), and the authentication information issuing unit 53 finishes the processing. In this case, the authentication information issuing unit 53 may further update fields, for example, the delivery vehicle of the issuing information, of the issuing table.

When issuing information has not been found (N in Step S316), or when the current time is after the reuse time limit of the authentication information included in the issuing information (N in Step S317), the authentication information issuing unit 53 executes the processing starting from Step S321.

As a result of the above-mentioned processing, when the reuse flag for the user is set to "ON," and authentication information set to the issuing inhibition state for the current reception location exists for the user being the delivery destination, the authentication information issuing unit 53 again issues the authentication information set to the issuing inhibition state as authentication information to be input by the user at the reception location. However, authentication information is not issued again after the reuse time limit thereof. In the example of FIG. 7, the reuse time limit is checked, but, instead, the issued date and time may be checked, to thereby determine whether or not the time limit has passed. Moreover, for example, issuing information of which the reuse time limit has passed may be extracted periodically, for example, once a day, and a flag indicating that the time limit has passed may be set to the extracted issuing information. Then, processing of confirming the flag may be executed in Step S317.

Processing from Step S321 to Step S325 is processing of enabling any users living together with the user, for example, family members, to use the issued authentication information to receive the package, and is executed after the settings for the user are acquired.

In Step S321, the authentication information issuing unit 53 determines whether the family flag of the settings is "ON" or "OFF" (Step S321). When the family flag of the settings is "OFF" (N in Step S321), the authentication information issuing unit 53 does not execute processing from Step S322 to Step S325 described below, and executes processing starting from Step S331 of FIG. 9. Meanwhile, when the family flag of the settings is "ON" (Y in Step S321), the authentication information issuing unit 53 searches, from the issuing table, for authentication information stored in association with the user receiving the package and the reception location (Step S322).

When issuing information (including the authentication information) stored in association with the acquired user and the reception location has been found from the issuing table in the search (Y in Step S323), and the current time is before the reuse time limit of the authentication information included in the issuing information (Y in Step S324), the authentication information issuing unit 53 issues the authentication information found in the search as authentication information to be input by the user to receive the package for this time (Step S325), and the authentication information issuing unit 53 finishes the processing. In this case, the authentication information issuing unit 53 may further update fields, for example, the delivery vehicle of the issuing information, of the issuing table.

When issuing information has not been found (N in Step S323), or when the current time is after the reuse time limit of the authentication information included in the issuing information (N in Step S324), the authentication information issuing unit 53 executes the processing starting from Step S331.

Through the processing from Step S321 to Step S325, when the family flag for the user is set to "ON," and authentication information set to the issuing inhibition state for the reception location exists for the user associated with the user being the delivery destination, the authentication information issuing unit 53 again issues the authentication information set to the issuing inhibition state as authentication information to be input by the user receiving the package at the reception location. However, authentication information is not issued again after the reuse time limit thereof. In the example of FIG. 8, the reuse time limit is checked, but, instead, the issued date and time may be checked, to thereby determine whether or not the time limit has passed. Moreover, for example, issuing information of which reuse time limit has passed may be extracted periodically, for example, once a day, and a flag indicating that the time limit has passed may be set to the extracted issuing information. Then, processing of confirming the flag may be executed in Step S324.

When authentication information has not been issued by the processing described above, in Step S331, the authentication information issuing unit 53 generates, based on a random number, candidate information for authentication information. The candidate information is a random number. The authentication information issuing unit 53 checks whether or not authentication information which is a duplicate of the generated candidate information exists for the current reception location in the issuing table (Step S332). More specifically, the authentication information issuing unit 53 searches for issuing information including the current reception location in the field of the reception location and the candidate information in the field of the authentication information, to thereby determine whether or not the issuing information is found.

When duplicate authentication information with respect to the reception location has not been found (N in Step S333), the candidate information is in a state in which the candidate information can be issued as authentication information, and processing starting from Step S335 is thus executed. Meanwhile, when duplicate authentication information with respect to the reception location has been found (Y in Step S333), the authentication information issuing unit 53 determines whether or not the restriction time limit of the found authentication information is after the current time (Step S334). When the restriction time limit is after the current time (Y in Step S334), the candidate information cannot be issued for the reception location, and hence the processing starting from Step S331 is repeated, to thereby generate another piece of candidate information. When the restriction time limit is not after the current time (N in Step S334), the candidate information is in the state in which the candidate information can be issued as authentication information, and hence the authentication information issuing unit 53 thus executes the processing starting from Step S335.

In Step S355, the authentication information issuing unit 53 issues, to the user, the candidate information as authentication information. After that, the authentication information issuing unit 53 stores, in the issuing table, the authentication information in association with the current reception location and the user (Step S338). Specifically, the authentication information issuing unit 53 creates issuing information including the reception location, the issued authentication information, the issued date and time including the current date and time, and the user ID of the user whose authentication information is issued, and adds the issuing information to the issuing table.

The authentication information issuing unit 53 may execute periodically, for example, once a day, processing of deleting issuing information after the restriction time limits, to thereby release the state in which authentication information cannot be issued. In this case, in Step S332, the reception location and the authentication information are set in advance as a primary key for uniquely identifying the issuing information in the issuing table, and the duplication may be checked based on whether or not an error occurs at the time of addition of the issuing information including the current reception location in the field of the reception location and the candidate information in the field of the authentication information. Moreover, when the duplication has been found in Step S333, the processing starting from Step S331 may be repeated.

Through the processing from Step S331 to Step S333, the same authentication information can be prevented from being issued for the same reception location. For example, in FIG. 11, issuing information having authentication information "654321" is issued so as to prevent issuing information having the same authentication information (for example, "123456") and the same reception location R1 from being issued.

FIG. 12 is a table for showing another example of the data stored in the issuing table. Authentication information "123456" was issued to a user "AAA" for the reception location "R1" on March 1, but authentication information "123456" was issued to another user "DDD" for the reception location "R1" on March 4, on which the restriction time limit had passed. As described above, a finite information amount with respect to the authentication information can effectively be used by facilitating the reuse of the authentication information.

In such a case where plural deliveries are performed in a certain period of time, the number of pieces of authentication information to be issued to the users can be reduced by setting the reuse time limit while reducing a fear in that pieces of authentication information are mixed up. As a result, the finite information amount with respect to the authentication information can effectively be used. Moreover, the finite information amount of the authentication information can effectively be used by issuing the same authentication information to users living in the same residence. Further, packages for plural users can be received at once, and a load on the users can be reduced in the reception of the packages. Still further, for example, unexpected reception of a package can be prevented among family members by enabling a user to select whether or not a user living together with the user can receive the package.

Yet further, by setting a period between a time limit (for example, reuse time limit) until which the authentication information can actually be used and the restriction time limit, it is possible to suppress an occurrence of such a problem that another user inputs old authentication information by mistake, and a package that should not be passed is passed to the another user.

In at least one embodiment, the issuing of the issued authentication information is restricted through use of the issuing table, but the restriction may be made through use of other methods. For example, there may be created a table in which plural pieces of authentication information are stored in order, and the authentication information issuing unit 53 advances, by one each time, a position of the authentication information to be issued for a next time in the table, to thereby restrict the issuing of the authentication information. In the table, when the plural pieces of authentication information are arranged so that each of as many types of authentication information as possible appears only once while having randomness, the issuing of the same authentication information can be restricted for a certain period of time by advancing the position.

Figure 13:
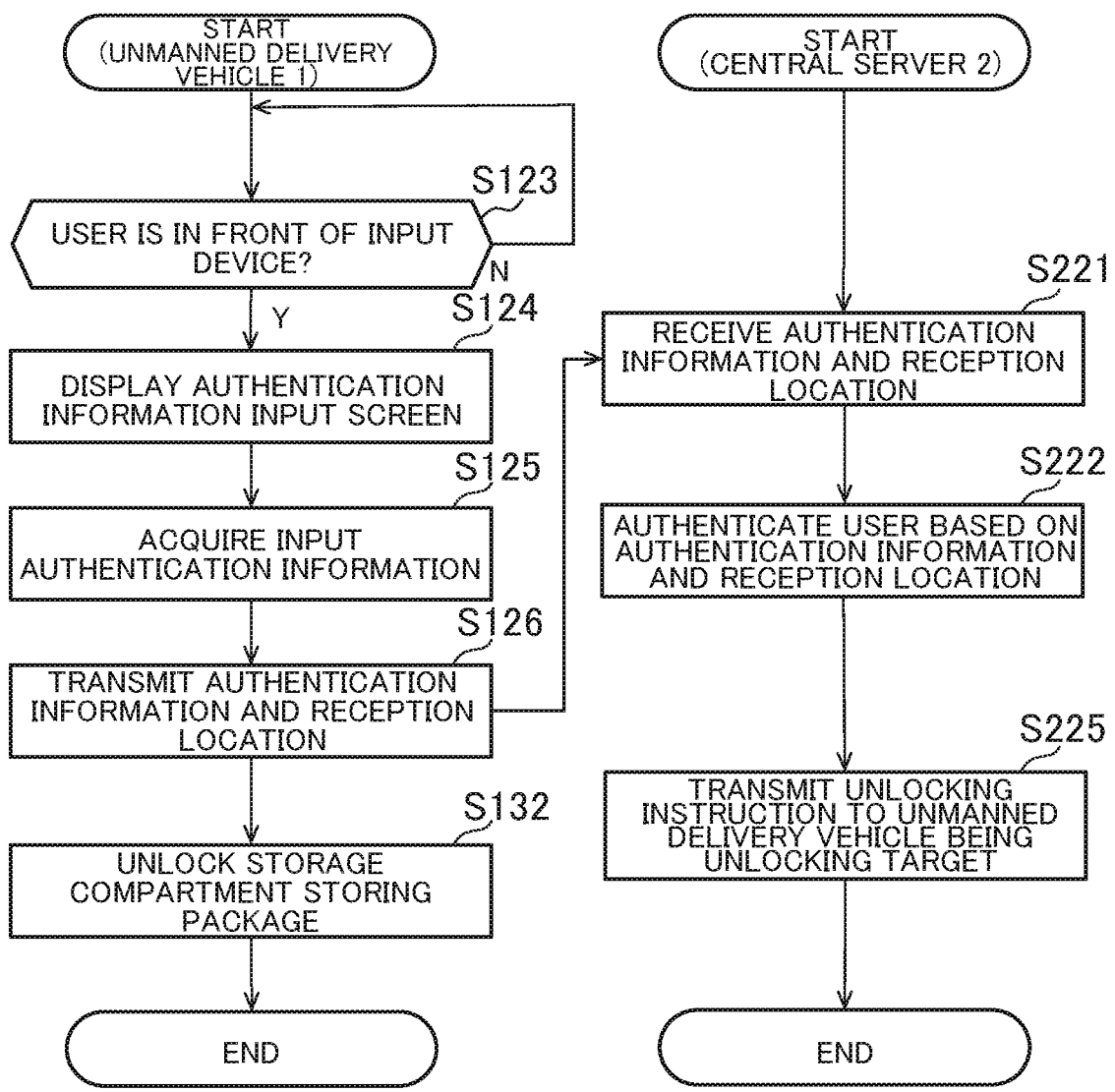
FIG. 13 is a flowchart for illustrating an example of processing to be executed by the unmanned delivery vehicle and the central server.

FIG. 13 is a flowchart for illustrating an example of processing to be executed by the unmanned delivery vehicle 1 having started to wait at a delivery destination and the central server 2. In FIG. 13, there is illustrated processing that is executed by the unmanned delivery vehicle 1 and the central server 2 and relates to input of a reception code by a user, unlocking, and completion of delivery.

First, the authentication information reception unit 55 determines whether or not the user is in front of the touch panel of the input/output unit 14 (Step S123). The authentication information reception unit 55 may determine whether or not the user is in front of the input/output unit 14 depending on whether or not the touch panel has been pressed, or based on a result of detection by an infrared sensor or the lidar of the sensor unit 15. When the user is not in front of the input/output unit 14 (N in Step S123), the processing in Step S123 is repeated.

When the user is in front of the input/output unit 14 (Y in Step S123), the authentication information reception unit 55 displays an authentication information input screen on the display of the input/output unit 14 (Step S124). After that, when the user who has recognized the authentication information input screen has input the reception code, the authentication information reception unit 55 acquires the authentication information input from the input/output unit 14 (Step S125). The authentication information reception unit 55 may acquire the PIN code input on the touch panel as the authentication information. When the authentication information reception unit 55 has acquired the authentication information, the authentication information reception unit 55 transmits the authentication information and the reception location to the central server 2 (Step S126). Instead of the authentication information, information (for example, hash value) obtained by processing the authentication information may be transmitted.

The authentication unit 56 of the central server 2 receives the authentication information and the reception location through the communication unit 23 (Step S221). The authentication unit 56 authenticates the user based on the received authentication information and reception location (Step S222). Moreover, when the user has been authenticated, the unlocking instruction unit 57 transmits the unlocking instruction to unlock the storage compartment 16 being the unlocking target to the unmanned delivery vehicle 1 being the unlocking target (Step S225). The unlocking instruction includes information indicating the storage compartment being the unlocking target (for example, identification information on storage compartment 16 or information for identifying user who is to receive package).

The unlocking unit 58 of the unmanned delivery vehicle 1 receives the unlocking instruction, and unlocks the door of the storage compartment 16 storing a package to be delivered to the user (Step S132). The unmanned delivery vehicle 1 may detect the reception of the package by the user, to thereby transmit, to the central server 2, the delivery completion information indicating the completion of the delivery to the user, which is not shown in FIG. 13. As described above, the user uses the issued authentication information, to thereby be able to receive the package.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A package reception management system, comprising:
a delivery vehicle configured to move in an unmanned operation;
at least one processor; and
at least one memory device that stores a plurality of instructions which, when executed by the at least one processor, causes the at least one processor to:
acquire a location of a reception region in which a first package transported by the delivery vehicle is to be delivered to a first user at a delivery destination;
issue first authentication information to be input to the delivery vehicle in the reception region by the first user at the delivery destination;
notify the first user of the issued authentication information,
wherein the plurality of instructions cause the at least one processor to restrict re-issuing the first authentication information for the reception region,
wherein the reception region is assigned to a plurality of delivery destinations, and
wherein the first authentication information is reissued in another reception region and is associated with the delivery of a second package;
wherein the plurality of instructions cause the at least one processor to authenticate the first user based on an information input by the first user and the first authentication information,
wherein the delivery vehicle comprises a storage compartment and a sensor configured to detect the presence of a package in the storage compartment,
wherein the delivery vehicle comprises a mechanism with a lock configured to prevent unloading of a package;
wherein the plurality of instructions cause the at least one processor to transmit an unlocking instruction to the delivery vehicle to unlock the mechanism after authenticating the first user, and
wherein the delivery vehicle delivers the first package to the delivery destination.

2. The package reception management system according to claim 1,
wherein the plurality of instructions cause the at least one processor to set the first authentication information to an issuing inhibition state for the reception region, and
wherein the plurality of instructions cause the at least one processor to issue second authentication information, which is different from the first authentication information.

3. The package reception management system according to claim 2, wherein the plurality of instructions cause the at least one processor to release the issuing inhibition state of authentication information that has been set to the issuing inhibition state and has an elapsed issuing restriction time limit, which is set in accordance with an issued time of the authentication information.

4. The package reception management system according to claim 2,
wherein the plurality of instructions cause the at least one processor to issue first authentication information to be input in the reception region by a first user being a delivery destination of the first package and second authentication information to be input in the reception region by a second user being a delivery destination of a third package, and
wherein the plurality of instructions cause the at least one processor to set the issued first authentication information and the issued second authentication information to the issuing inhibition state for the reception region.

5. The package reception management system according to claim 2, wherein the plurality of instructions cause the at least one processor to issue the authentication information set to the issuing inhibition state as the authentication information to be input by the user in the reception region, when authentication information set to the issuing inhibition state for the reception region exists for the user being the delivery destination.

6. The package reception management system according to claim 2, wherein the plurality of instructions cause the at least one processor to issue, when authentication information, which is set to the issuing inhibition state for the reception region, exists for another user associated with the user at the delivery destination, the authentication information as the authentication information to be input by a user who receives the first package in the reception region.

7. The package reception management system according to claim 6, wherein the plurality of instructions cause the at least one processor to notify the user, who is at the delivery destination, of the authentication information and to notify another user who is associated with the user at the delivery destination.

8. The package reception management system according to claim 1, wherein the plurality of instructions cause the at least one processor to issue, after the delivery vehicle has arrived at the reception region, the authentication information to be input into the delivery vehicle in the reception region by the user being the delivery destination.

9. A package reception management method, comprising:
acquiring, with at least one processor operating with a memory device in a system, a location of a reception region in which a first package transported by a delivery vehicle is to be passed to a user being a delivery destination, the delivery vehicle being configured to move in an unmanned operation;
issuing, with the at least one processor operating with the memory device in the system, first authentication information to be input to the delivery vehicle in the reception region by the user being the delivery destination;
restricting, with the at least one processor operating with the memory device in the system, re-issuing the issued authentication information for the reception region;
notifying, with the at least one processor operating with the memory device in the system, the user of the issued authentication information,
wherein the reception region is assigned to a plurality of delivery destinations, and
wherein the first authentication information is reissued in another reception region and is associated with the delivery of a second package;
authenticating the first user based on an information input by the first user and the first authentication information,
wherein the delivery vehicle comprises a storage compartment and a sensor configured to detect the presence of a package in the storage compartment,
wherein the delivery vehicle comprises a mechanism with a lock configured to prevent unloading of a package;

transmitting an unlocking instruction to the delivery vehicle to unlock the mechanism after authenticating the first user, and wherein the delivery vehicle delivers the first package to the delivery destination.

10. A package reception management device, comprising:
at least one processor; and
   at least one memory device that stores a plurality of instructions which, when executed by the at least one processor, causes the at least one processor to:
   acquire a location of a reception region in which a first package transported by a delivery vehicle is to be passed to a user being a delivery destination, the delivery vehicle being configured to move in an unmanned operation;
   issue authentication information to be input to the delivery vehicle in the reception region by the user being the delivery destination;
   notify the user of the issued authentication information,
   wherein the plurality of instructions cause the at least one processor to restrict re-issuing of the issued authentication information for the reception region,
   wherein the reception region is assigned to a plurality of delivery destinations, and
   wherein the first authentication information is reissued in another reception region and is associated with the delivery of a second package;
   wherein the plurality of instructions cause the at least one processor to authenticate the first user based on an information input by the first user and the first authentication information,
   wherein the delivery vehicle comprises a storage compartment and a sensor configured to detect the presence of a package in the storage compartment,
   wherein the delivery vehicle comprises a mechanism with a lock configured to prevent unloading of a package;
   wherein the plurality of instructions cause the at least one processor to transmit an unlocking instruction to the delivery vehicle to unlock the mechanism after authenticating the first user, and
   wherein the delivery vehicle delivers the first package to the delivery destination.

11. The package reception management system according to claim 1, wherein the plurality of instructions cause the at least one processor to instruct the delivery vehicle to deliver the first package after confirming the first authentication information from the first user.

12. The package reception management system according to claim 1, wherein the delivery vehicle is configured to detect the approach of the first user and obtain authentication information from the first user.

13. The package reception management system according to claim 12, wherein the delivery vehicle comprises a mechanism with a lock configured to prevent unloading of a package;
   wherein the plurality of instructions cause the at least one processor to transmit an unlocking instruction to the delivery vehicle to unlock the mechanism after confirming the first authentication information from the first user.

* * * * *